J. P. Cowing
Pipe Coupling.
N°. 43,975.
Patented Aug. 30, 1864.

Witnesses:
George Cowing
John W. Cliff

Inventor:
John P. Cowing

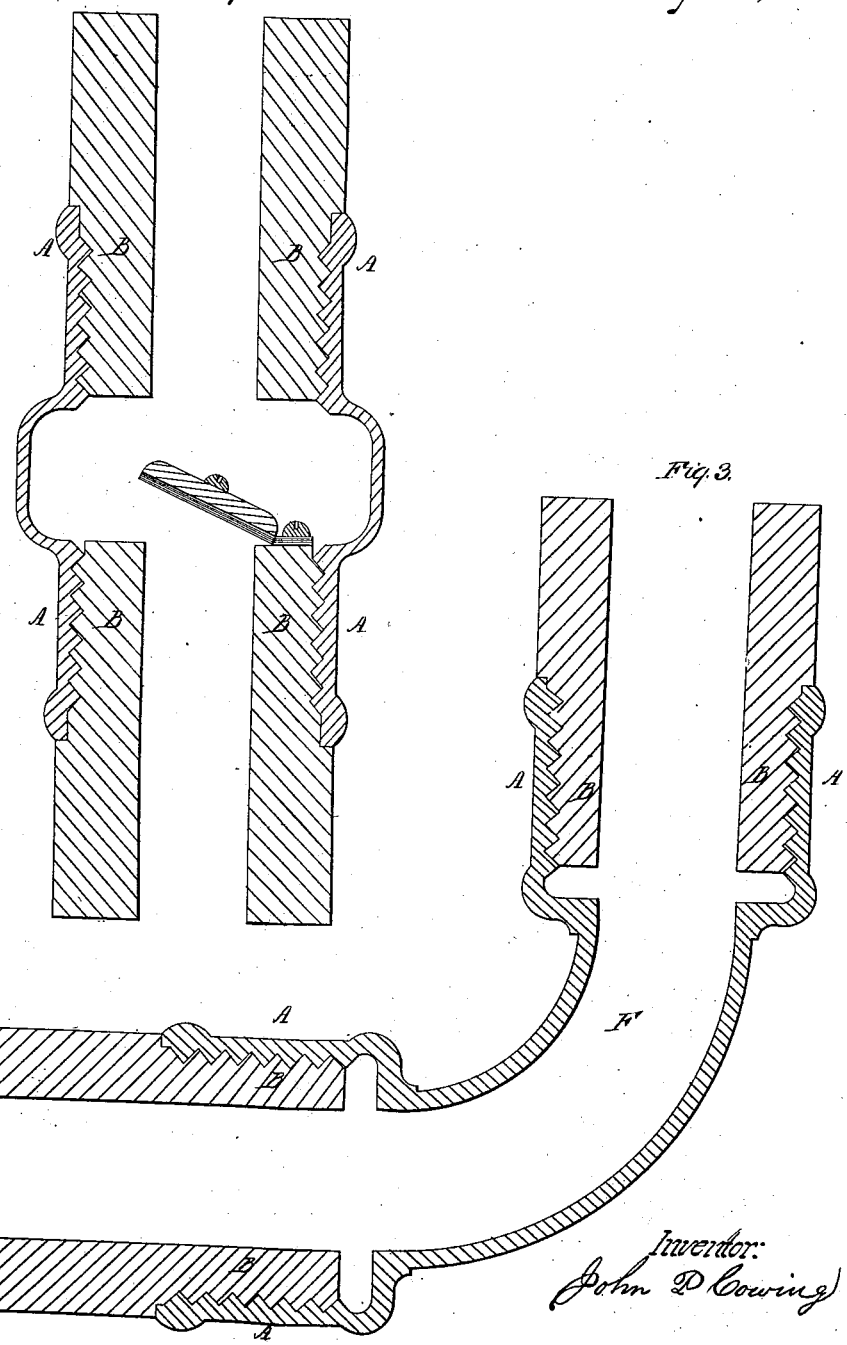

UNITED STATES PATENT OFFICE.

JOHN P. COWING, OF SENECA FALLS, NEW YORK.

IMPROVEMENT IN PUMP-PIPES.

Specification forming part of Letters Patent No. 43,975, dated August 30, 1864.

*To all whom it may concern:*

Be it known that I, JOHN P. COWING, of Seneca Falls, Seneca county, and State of New York, have invented a new and Improved Mode of Coupling Wooden Pipes; and I do hereby declare that the following is a full and exact description thereof, reference being had to the accompanying drawings, and to the letters of reference marked thereon.

The nature of my invention consists in the use of a cast-iron thimble or band having screw-threads cast on the inner surface of the same corresponding with similar threads cut on the outer surface of the tenon ends of the wooden pipe, whereby the ends of the pipe are banded, and at the same time jointed firmly together, as shown in the accompanying drawings, in which—

Figure 1:
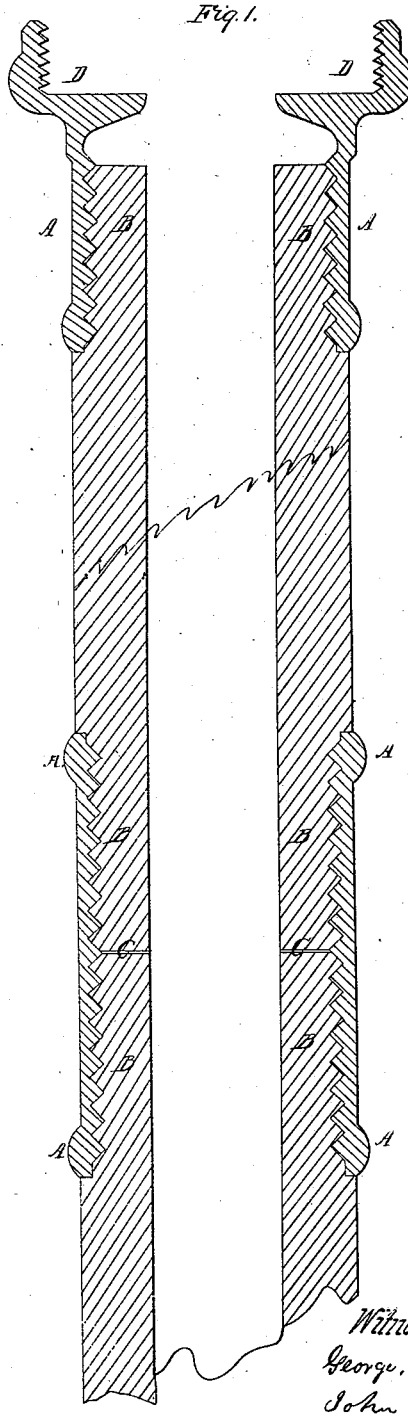
Figure 2:
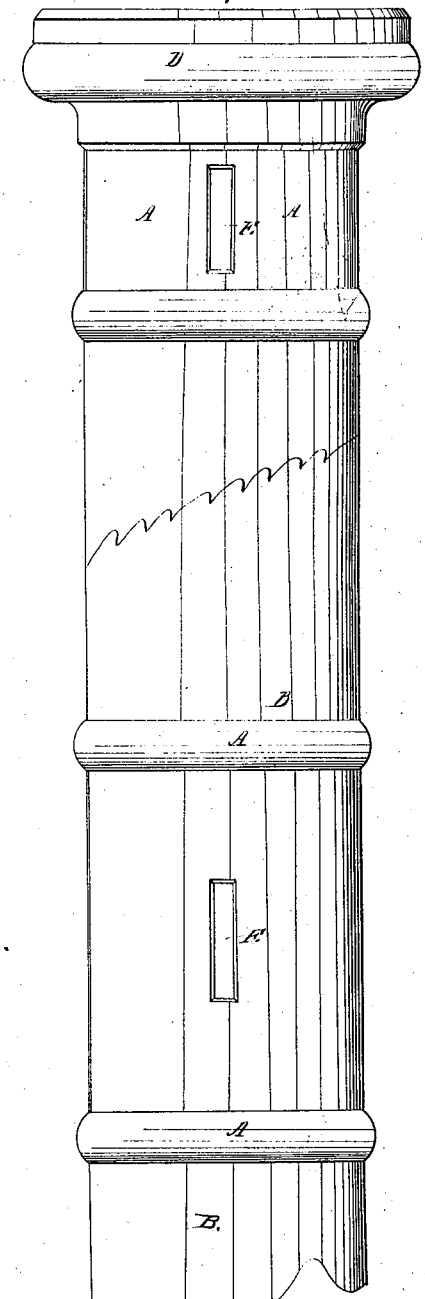

Figure 1 represents a longitudinal section of pipe with coupling and attachment, and Fig. 2 a perspective view of the same.

The ends of the pipe (marked B B B B) are shown screwed into the thimble A A A A to the point of meeting at C C.

D D represent a valve-seat, which may be attached to the end of the pipe B B by the band A, having a screw similar to the coupling.

In Fig. 2, E represents a lug for convenience in screwing the band on or off. The pipes are screwed together in the couplings when dry, and the swelling of the wood from the moisture of the water renders the joint water-tight and firm.

This mode of coupling enables me to make an elbow better than any elbow or crook heretofore made with wooden pipe. The same is shown in the sectional drawing Fig. 3, where F represents a curved water-passage, connecting the screws A A A A.

Fig. 4 represents a coupling adapted for foot or safety valve at or near the lower end of the pipe when used in connection with a pump.

I disclaim the application of this invention to gas-pipe, being aware that for that purpose a coupling similar in shape is used, but differing in material and mode of construction from mine.

I also disclaim the invention of cutting screw-threads on the ends of wooden pipe, both interior and exterior, for the purpose of coupling the same.

I also disclaim the casting of interior screw-threads for any other purpose but that of coupling wooden pipe. By this mode of coupling wooden pipe a saving of one-third of the timber is effected as compared to the old mode of coupling wooden pipe with screws cut in the wood. Other advantages of this mode are the facilities it affords for putting in elbows, branches, and valves without detriment to the strength or effective working of the pipe.

What I claim as my invention, and desire to secure by Letters Patent, is—

A pump-pipe coupled together, and otherwise constructed as described, as an article of manufacture.

JOHN P. COWING.

Witnesses:
C. A. PARSONS,
MARSHALL COWING.